July 13, 1965 H. J. MORRISON 3,195,076

IMPEDANCE MATCHING BALUN EMPLOYING A FERRITE CORE

Original Filed June 22, 1960

WITNESSES:

Bernard R. Gieguay

James H. Young

INVENTOR

Heber J. Morrison

BY

F. E. Browder

ATTORNEY

United States Patent Office 3,195,076
Patented July 13, 1965

3,195,076

IMPEDANCE MATCHING BALUN EMPLOYING A FERRITE CORE

Heber J. Morrison, Ellicott City, Md., assignor to Westinghouse Electric Corporation, East Pittsburgh, Pa., a corporation of Pennsylvania Continuation of application Ser. No. 37,920, June 22, 1960. This application July 7, 1961, Ser. No. 129,894
5 Claims. (Cl. 333—26)

This invention relates to transmission systems for electric currents of high frequency and, more particularly, to means for interconnecting balanced and unbalanced transmission lines and circuits in such systems.

This application is a continuation of my copending application Serial No. 37,920, filed June 22, 1960 and now abandoned which was a continuation in part of my application Serial No. 642,998, filed February 28, 1957 and now abandoned.

In radio transmitting and receiving equipment, it is often necessary to transform high frequency energy from one impedance level to another. It is also necessary sometimes to effect a transformation of high frequency energy between balanced and unbalanced circuits and transmission lines. It is desirable that equipment intended to accomplish such transformation operate efficiently over a wide range of frequencies without requiring tuning adjustments. It is also desirable in transmitting at high frequencies that transformations of large amounts of power be accomplished without imposing severe limitations on performance.

It is an object of this invention to provide a new and improved transformer.

It is another object of this invention to provide a new and improved means of interconnecting balanced and unbalanced circuits and transmission lines in a transmission system for electric currents of high frequency.

Another object of this invention is to provide a new and improved means of interconnecting circuits and transmission lines having different impedances in a transmission system for electric currents of high frequency.

A more spceific object of this invention is to provide an efficient means of interconnecting circuits and transmission lines in a transmission system for electric currents of high frequency over a broad band of operating frequencies without requiring tuning adjustments.

Other objects of the invention will in part be obvious and will in part appear hereinafter.

For a fuller understanding of the nature and objects of the invention reference should be had to the following detailed description taken in connection with the accompanying drawing, in which.

Figure 1:
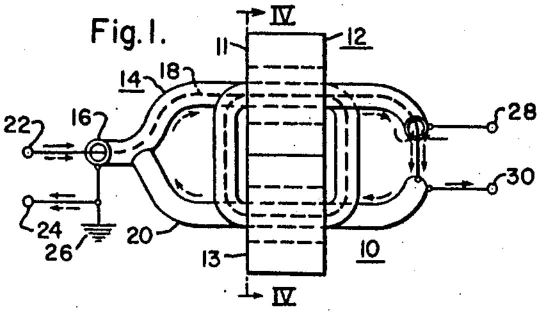
FIGURE 1 illustrates in simplified diagrammatic form an embodiment of the present invention adapted for interconnecting a balanced transmission line and an unbalanced transmission line having substantially the same characteristic impedance.

Referring now to the drawing and FIG. 1 in particular, a unity ratio balance-to-unbalance transformer 10 comprises a main winding 14, an auxiliary winding 20, and a magnetic core structure 12 on which the main winding 14 and the auxiliary winding 20 are inductively disposed. The unity ratio balance-to-unbalance transformer 10 is connected to an unbalanced circuit or transmission line at terminals 22 and 24, terminal 24 being connected to ground as indicated at 26. The unity ratio balance-to-unbalance transformer is connected to a balanced circuit or transmission line at terminals 28 and 30. The main winding 14 consists of an outer conductor or sheath 16 and an inner conductor 18. The auxiliary winding 20 is wound with a conductor having the same size and shape as the outer conductor 16 of the main winding.

Figure 3:
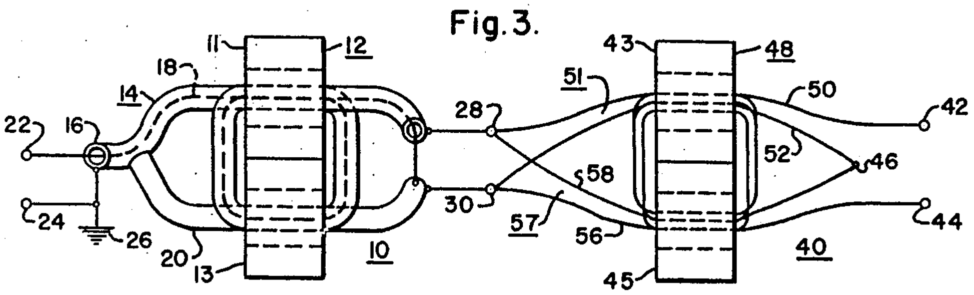
FIG. 3 illustrates in simplified diagrammatic form a second embodiment of the invention including an impedance matching section adapted for interconnecting a balanced transmission line and an unbalanced transmission line having different characteristic impedances.
Figure 4:
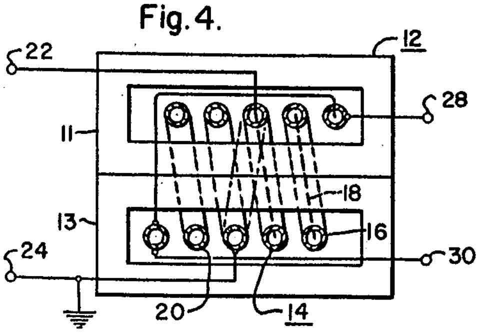
FIG. 4 is a cross sectional view taken along the line IV—IV of FIG. 1.

Referring to FIG. 4, in this embodiment of the invention, the magnetic core structure 12 of the unity ratio balance-to-unbalance transformer comprises two rectangular magnetic core sections 11 and 13. As shown in FIG. 1, FIG. 3 and FIG. 4, the auxiliary winding is connected between the outer conducting sheath of the main winding 14 near the connection to the unbalanced line at terminal 24 and the inner conductor 18 of the main winding 14 near the connection to the balanced transmission line at terminal 30. The main winding 14 and the auxiliary winding 20 are therefore connected in series circuit relationship with respect to the balanced transmission line and each winding has the same length and number of turns. The main winding 14 and the auxiliary winding 20 may each be of any desired number of turns.

Figure 2:
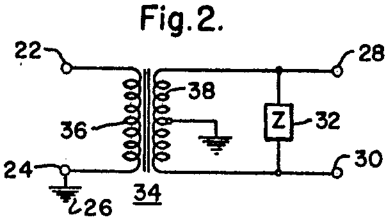
FIG. 2 is an electrically equivalent circuit of FIG. 1.

Referring to FIG. 2, the equivalent, electric circuit of the unity ratio balance-to-unbalance transformer 10 is shown to be that of a transformer 34 comprising a primary winding 36 and a secondary winding 38, each winding having an equal number of turns. The midpoint of the secondary winding 38 is effectively connected to ground. The impedance Z is the impedance presented by the main winding 14 at the balanced terminals 28 and 30.

The operation of the unity ratio balance-to-unbalance transformer 10 may be explained by assuming that a source of high frequency energy is present at the unbalanced terminals 22 and 24. If the instantaneous polarity of the voltage at terminal 22 is positive, the total current into the inner conductor 18 of the main winding 14 at terminal 22 may be represented as having two components, the load component represented by the solid arrow and the magnetizing component represented by the dotted arrow as shown in FIG. 1. In order to convert an unbalanced voltage at terminals 22 and 24 to a balanced voltage at terminals 28 and 30, the current at terminals 28 and 30 must be substantially equal in magnitude and 180° out of phase. In the absence of the auxiliary winding 20, the balanced terminal 28 would be shunted to ground by the effective inductance of the main winding 14. The function of the auxiliary winding 20 is to equalize the shunting effect of the main winding 14 to providing an equal effective inductance between balanced terminal 30 and ground.

Referring to FIG. 1, the instantaneous polarity of voltage at terminal 22 is assumed to be positive so that the total current is flowing into the inner conductor 18 of the main winding 14 at terminal 22. As the components of the total current flow out of the inner conductor 18 of the main winding 14, the load component of the total current flows into terminal 30 of the balanced circuit or transmission line, through the balanced load and back through terminal 28 into the main winding 14. The load component of the total current then flows on the inner portion of the outer conducting sheath 16, returning to the unbalanced source through terminal 24. At the point where the total current leaves the main winding 14, the magnetizing component of the total current flows along the auxiliary winding 20 back to the point where the auxiliary winding 20 is connected to the outer conducting sheath 16 of the main winding 14. The magnetizing component of the total current then flows back towards terminal 28 of the balanced transmission line on the outer portion of the outer conducting sheath 16, returning to the unbalanced source along the inner portion of the outer conducting sheath 16 of the main winding 14 to terminal 24. During the following half cycle of high frequency current, the polarity of the unbalanced voltage at terminal 22 is reversed and the direction of flow of the components of current just described is also reversed. There can be no magnetic coupling between the total current flowing on the inner conductor 18 and the magnetizing component of the total current flowing on the outer portion of the outer conducting sheath 16 and the auxiliary winding 20 because of the shielding effect of the outer conducting sheath 16 which surrounds the inner conductor 18.

It will be seen that the unity ratio balance-to-unbalance transformer possesses symmetry as view from the balanced terminals 28 and 30 because the effective impedance from either of the balanced terminals to ground is the same at any load including a shorted or open circuit that may be connected at the unbalanced terminals 22 and 24. This is illustrated in FIG. 2 in which the effective inductance of the main winding 14 and the effective inductance of the auxiliary winding 20 are shown connected in series to form a secondary winding 38 of the transformer 34 which is grounded at the midpoint.

It has been found that the upper frequency limit of the unity ratio balance-to-unbalance transformer shown in FIG. 1 is determined for a particular application by the eventual series resonance which arises in the main winding 14 and the auxiliary winding 20. The upper frequency limit of the unity ratio balance-to-unbalance transformer 10 is also determined by the losses in the magnetic core structure 12 which can be tolerated at very high frequencies.

The lower frequency limit of the unity ratio balance-to-unbalance transformer is determined by the amount of shunt inductance existing between each balanced terminal 28 and 30 and ground that can be tolerated for a particular application.

Referring to FIG. 4, the function of the magnetic core structure 12 which includes magnetic core sections 11 and 13, is to improve the lower frequency limit of the unity ratio balance-to-unbalance transformer 10 by increasing the effective shunt inductance existing between each balanced terminal and ground. The effective shunt inductance between each balanced terminal and ground is also increased as shown in FIG. 4 by disposing the main winding 14 and the auxiliary winding 20 on the magnetic core structure 12 so that the magnetic flux produced by each winding is aiding.

The magnetic core sections 11 and 13 of the magnetic core 12 which is illustrated as being of the shell form type are preferably formed from a suitable non-metallic ferrite magnetic material having a sufficiently high permeability at the lowest frequency in the operating range of the transformer or balancing unit 10 and having a relatively low conductivity at the highest frequency in said operating range so that the operating losses of the magnetic core 12 at the latter frequency are not excessive. An example of a ferrite material which was employed with fairly good results for a frequency range of from approximately two to thirty megacycles is one having the following composition by weight:

| | Percent |
|---|---|
| $Fe_2O_3$ | 75.0 |
| NiO | 8.6 |
| ZnO | 13.7 |
| MnO | 1.05 |
| CoO | 0.56 |

An example of a preferred ferrite magnetic material which was employed with unusually good results or performance for the above frequency range was one having the following composition by weight:

| | Percent |
|---|---|
| $Fe_2O_3$ | 76.0 |
| ZnO | 10.8 |
| NiO | 11.2 |
| MnO | 1.5 |
| CoO | 0.5 |

The latter composition, which may be described as a zinc-nickel ferrite of the spinel type containing additives such as manganese and cobalt, is disclosed in greater detail in copending application Serial No. 230,168, filed October 12, 1962, by W. G. Carlson et al., which corresponds to W. E. Case No. 32,552 and which is assigned to the same assignee as the present application. The ferrite material disclosed in the latter application has been found to have an initial permeability of 112 and a corresponding loss factor of $2.5\times10^{-4}$ at a frequency of thirty megacycles. The magnetic core sections 11 and 13 can be formed in the shape of C core sections or bricks or bars which are assembled around the associated windings 14 and 20 or as toroidal core sections on which said windings are assembled.

It will be seen that an unbalanced component of voltage will be induced across the balanced transmission line terminals 28 and 30 by current flowing along the section of inner conductor 18 between the point where it leaves the main winding 14 and the point where it connects to the auxiliary winding 20 at terminal 30. It is therefore necessary to keep this connecting section of inner conductor to a minimum to prevent the introduction of an unbalanced component of voltage across the balanced terminals 28 and 30.

In summary, the function of the unity ratio balance-to-unbalance transformer 10 is to convert an unbalanced voltage with respect to ground to a balanced voltage with respect to ground, the balanced voltage having substantially the same magnitude between terminals as the unbalanced voltage. It will be seen, therefore, that for impedance matching purposes the unity ratio balance-to-unbalance transformer would be especially useful for interconnecting unbalanced circuits and transmission lines with balanced circuits and transmission lines having substantially the same impedance.

Referring to FIG. 3, the unity ratio balance-to-unbalance transformer 10 is shown in combination with an impedance matching section 40. The structure of the unity ratio balance-to-unbalance transformer would be the same as already discussed. In general, the unity ratio transformer 10 is connected in series circuit relationship with the impedance matching section 40. The output of the unity ratio transformer 10 at terminals 28 and 30 is connected to the input of the impedance matching section 40 at terminals 28 and 30. A balanced transmission line would be connected to the impedance matching section 40 at terminals 42 and 44.

The impedance matching section 40 comprises a first winding 51, a second winding 57, and a magnetic core structure 48 preferably formed from the same ferrite magnetic material as the magnetic core structure 12 previously described, on which the first winding and the second winding are inductively disposed. The first winding 51 consists of a section of open, balanced transmission line having two conductors 50 and 52. The second winding 57 also consists of a section of open, balanced transmission line having two conductors 56 and 58. The two windings 51 and 57 are connected in parallel circuit relationship with respect to terminals 28 and 30 and series circuit relationship with respect to the balanced circuit or transmission line terminals 42 and 44. The conductor 52 of the first winding 51 is connected to conductor 58 of the second winding 57 at the terminal 46. The conductor 50 of the first winding 51 and the conductor 56 of the second winding 57 are brought out to terminals 42 and 44 respectively for connection to a balanced transmission line. The magnetic core sections 43 and 45 which make up the magnetic core structure 48 have the same cross section as the magnetic core structure 12 shown in FIG. 4.

Figure 5:
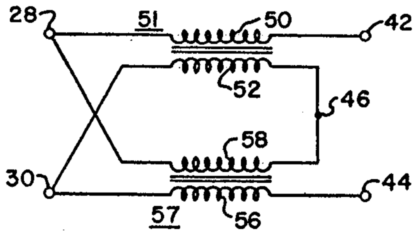
FIG. 5 is an electrically equivalent circuit of the impedance matching section shown in FIG. 3.

Referring to FIG. 5, the electrically equivalent circuit of the impedance matching section 40 comprises a first transformer 51, having a primary winding 52 and a secondary winding 50, and a second transformer 57, having a primary winding 58 and secondary winding 56. The primary windings of each transformer in the equivalent circuit have an equal number of turns and the primary windings 52 and 58 of the transformers 51 and 57, respectively, are connected in series circuit relationship across the terminals 28 and 30. The windings of the first transformer 51 are inductively disposed on the magnetic core structure 48 so that the relative polarity of the voltage at the terminal 46 with respect to ground is the same as the relative polarity of the voltage induced in the secondary winding 50 at terminal 42. The windings of the transformer 57 are inductively disposed on the magnetic core structure 48 so that the relative polarity of the voltage at terminal 46 with respect to ground is the same as the relative polarity of the voltage induced in the secondary winding 56 at terminal 44.

The operation of the combination shown in FIG. 3 may be explained by observing first that the operation of the unity ratio balance-to-unbalance transformer 10 would be the same as previously explained. An unbalanced voltage impressed across terminals 22 and 24 will be converted to a voltage of substantially equal magnitude balanced with respect to ground at terminals 28 and 30.

The operation of the impedance matching section 40 may be explained by assuming that a voltage difference of two volts exists between terminals 28 and 30 and that the instantaneous value of the voltage at terminal 28 is plus 1 volt and that the instantaneous value of the voltage at terminal 30 is minus 1 volt, both voltages with respect to ground. Referring to FIG. 5, it will be seen from the electrically equivalent circuit that the voltage at terminal 46 will then be zero volts with respect to ground. A voltage difference of one volt therefore will exist across each primary winding 52 and 58. Since the secondary windings 50 and 56 each have the same number of turns as the primary windings 52 and 58 respectively, a voltage of one volt will be induced in each secondary winding 50 and 56 respectively. Because of the manner in which the windings of the transformers 51 and 57 are disposed on the magnetic core structure 48, as explained previously, the relative polarity of the voltages induced in the secondary windings 50 and 56 are such that under the assumed conditions a voltage of plus 2 volts would result at terminal 42 and a voltage of minus 2 volts would result at terminal 44. It will be seen, therefore, that the function of the impedance matching section 40 is to step up the voltage impressed across its input terminals 28 and 30 to a voltage having substantially twice the magnitude across the terminals 42 and 44 at its output.

For impedance matching purposes, the embodiment of the impedance matching section 40 shown in FIG. 3 would be adapted for matching a transmission line connected at terminals 42 and 44 having a characteristic impedance four times as great as the characteristic impedance of the transmission line connected at terminals 28 and 30 since the change in the voltage level of the high frequency energy is two to one. In addition, for proper impedance matching, the characteristic impedance of each of the open transmission line sections which make up the first winding 51 and the second winding 57 of the impedance matching section 40 should be twice the characteristic impedance of the transmission line to be connected at terminals 28 and 30. The characteristic impedance of the transmission line sections which make up the first winding 51 and the second winding 57 should also be half the characteristic impedance of the transmission line to be connected at terminals 42 and 44. In particular, where the unity ratio balance-to-unbalance transformer 10 is connected in series circuit relationship with the impedance matching section 10, the characteristic impedance of each of the transmission line sections which make up the first winding 51 and the second winding 57 should be twice the characteristic impedance of the unbalanced transmission line connected at the input of the impedance matching section 40 and used for the main winding 14 of the unity ratio balance-to-unbalance transformer 10.

It is to be understood that the impedance matching section 40 may be used independently from the unity ratio balance-to-unbalance transformer 10 for impedance matching purposes when interconnecting one balanced transmission line to a second balanced transmission line or when interconnecting one unbalanced transmission line to a second unbalanced transmission line having the desired ratio of characteristic impedances.

Figure 6:
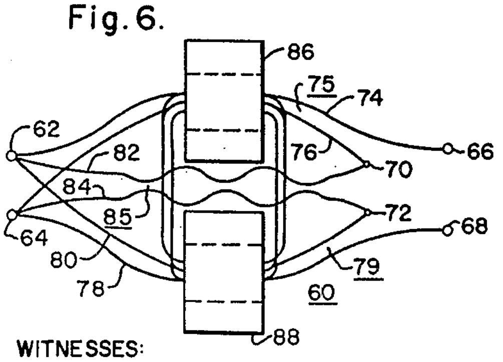
FIG. 6 illustrates in simplified diagrammatic form a second embodiment of the impedance matching section shown in FIG. 3.

Referring to FIG. 6, an impedance matching section 60 is shown which may be substituted for the impedance matching section 40 in the combination shown in FIG. 3. The impedance matching section 60 is connected in series circuit relationship at terminals 62 and 64 with the unity ratio balance-to-unbalance transformer 10, the structure of which has already been described. The impedance matching section 60 comprises a first winding 75, a second winding 85, a third winding 79 and two magnetic core sections 86 and 88 on which the first winding 75 and the third winding 79 respectively are inductively disposed. The magnetic core sections 86 and 88 are preferably formed from the same ferrite magnetic material as the magnetic core structure previously described. The first winding 75 comprises a section of open balanced transmission line having conductors 74 and 76. The second winding 85 comprises a section of open balanced tranmission line having conductors 82 and 84. The third winding 79 comprises an open balanced transmission line having conductors 78 and 80. The length of transmission line used in each winding 75, 85 and 79 is the same. The number of turns of the first winding 75 and the third winding 79 which are inductively disposed on the magnetic core sections 86 and 88 respectively is equal. The three windings 75, 85 and 79 are connected in parallel circuit relationship with respect to input terminals 62 and 64 and in series circuit relationship with respect to output terminals 66 and 68. The magnetic core sections 86 and 88 are similar in structure to the magnetic core structure 12 as shown in FIG. 4. The conductor 76 of the first winding 75 is connected to the conductor 82 of the second winding 85 at terminal 70. The conductor 84 of the second winding 85 is connected to the conductor 80 of the third winding 79 at terminal 72. The conductor 74 of the first winding 75 and the conductor 78 of the third winding 79 are brought out to terminals 66 and 68 which are the output terminals of the impedance matching section 60. As previously discussed, the input of the impedance matching section 60 would be impressed across terminals 62 and 64.

Figure 7:
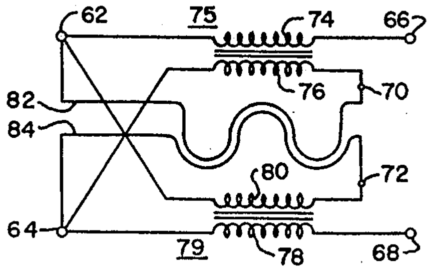
FIG. 7 is an electrically equivalent circuit of FIG. 6.

Referring to FIG. 7, the electrically equivalent circuit of the impedance matching section 60 includes a first transformer 75 having a primary winding 76 and a secondary winding 74 and a second transformer 79 having a primary winding 80 and a secondary winding 78. The windings 74, 76, 78 and 80 of the transformers 75 and 79 respectively each have an equal number of turns. The windings of the transformers 75 and 79 are so inductively disposed on the magnetic core sections 86 and 88 respectively that the relative polarity with respect to ground of a voltage at terminal 70 would be the same as the relative polarity with respect to ground of the voltage induced in the secondary winding 74 of transformer 75 at terminal 66 and the relative polarity with respect to ground of a voltage at terminal 72 would be the same as the relative polarity with respect to ground of the voltage induced in the secondary winding 80 of the transformer 79 at the terminal 68.

When the impedance matching section 60 is substituted for the impedance matching section 40 in the combination shown in FIG. 3, the operation of the unity ratio balance-to-unbalance transformer would be the same as previously explained. The operation of the impedance matching section 60 would be similar to that of the impedance matching section 40 except that a high frequency voltage impressed across terminals 62 and 64 would be stepped up to a voltage at terminals 66 and 68 having a magnitude substantially three times as great as the voltage across the terminals 62 and 64.

The detailed operation of the impedance matching section 60 may be explained by assuming that a voltage difference of two volts exists across the input terminals 62 and 64 and that the instantaneous voltage at terminal 62 is plus 1 volt and that the instantaneous voltage at terminal 64 is minus 1 volt with respect to ground. Since the second winding 85 is not inductively disposed on a magnetic core the voltages existing at terminals 62 and 64 are brought through to terminals 70 and 72 substantially unchanged in magnitude. It will be seen, therefore, that the voltage impressed across each primary winding 76 and 80 respectively as shown in FIG. 7 will be two volts. Because of the relative polarities of the windings of the transformers 75 and 79 already explained, the voltages resulting at the output terminals 66 and 68 are plus 3 volts and minus 3 volts respectively. In summary then, the function of the impedance matching section 60 is to step up a voltage impressed at its input terminals 62 and 64 to a voltage having substantially three times the magnitude of the input voltage at the output terminals 66 and 68.

For proper impedance matching purposes, since the ratio of the voltage change accomplished by the impedance matching transformer 60 is substantially 3 to 1, the characteristic impedance of the transmission line which is connected across the output terminals 66 and 68 should be nine times the characteristic impedance of the transmission line connected across the input terminals 62 and 64. In addition, the characteristic impedance of the open balanced transmission line which makes up windings 74, 85 and 79 shoud be three times the characteristic impedance of the transmission line which is connected at the input terminals 62 and 64 and one-third the characteristic impedance of the transmission line which is connected at the output terminals 66 and 68. The three sections of transmission line which make-up the three windings 75, 85 and 79 should each be of equal length so that the transmission line delay will be the same for each winding and therefore the terminal voltages will add in phase.

It is to be understood that the two separate magnetic core sections included in the various embodiments of this invention may be combined in a single magnetic core. It is also to be understood that the impedance matching section to be used in combination with a unity ratio balance-to-unbalance transformer could have its windings inductively disposed on the same magnetic core structure as the unity ratio transformer. It has been found, however, that separate magnetic core structures for the unity ratio transformer and the impedance matching section are more desirable because at high frequencies the induced voltages in the unity ratio transformer and the impedance matching section are not in phase and should not be wound on the same magnetic core structure if the maximum frequency bandwith is to be obtained.

It is also to be understood that higher ratio impedance matching sections may be attained by use of the methods indicated in the embodiments of this invention, that is by the proper arrangement of series and parallel connections of transmission line sections with the necessary regard for the characteristic impedances of the various transmission line sections. As stated previously, the impedance matching sections included with the various embodiments of this invention may be used independently of the unity ratio balance-to-unbalance transformer for interconnecting one balanced transmission line with a second balanced transmission line and for interconnecting one unbalaced transmission line with a second balanced transmission line.

The apparatus embodying the teachings of this invention has several advantages. The unity ratio balance-to-unbalance transformer in combination with an impedance matching section may be used to interconnect balanced and unbalanced transmission lines and circuits in transmission systems for electric currents for high frequency and operates efficiently over a wide range of frequencies without requiring tuning adjustments, and is capable of handling large amounts of power limited only by the characteristics of the transmission lines employed.

Since numerous changes may be made in the above described apparatus and circuits and different embodiments of the invention may be made without departing from the spirit and scope thereof, it is intended that all matter contained in the foregoing description or in the accompany drawings shall be interpreted as illustrative and not in a limiting sense.

I claim as my invention:

1. In a transmission system for electric currents of high frequency in which energy flows between balanced and unbalanced circuits, the combination comprising, first circuit means for converting a voltage which is unbalanced with respect to ground to a voltage which is balanced with respect to ground comprising a main winding comprising several turns of a coaxial line having an inner conductor and an outer conductor, an auxiliary winding having the same number or conductor turns as said main winding, and a first magnetic core on which said main winding and said auxiliary winding are inductively disposed, said first magnetic core being formed from ferrite magnetic material to reduce the losses in said magnetic core at higher frequencies; second circuit means for matching the impedance of said blanced and unbalanced circuits connected in series circuit relationship with said first circuit means and comprising several additional windings of balanced transmission line, at least two of said windings having the same number of turns, and a second magnetic core on which only two of said additional windings are inductively disposed, said additional windings being connected in parallel circuit relationship with respect to the connection to said main winding of said first circuit means and in series circuit relationship with respect to a balanced circuit at the other end of said additional windings, said main winding of said first circuit means being connected to said second circuit means at one end and to an unbalanced circuit at the other end, and said auxiliary winding of said first circuit means being connected to said outer conductor of said main winding at the connection to an unbalanced circuit and to said inner conductor of said main winding at the connection to the second circuit means.

2. In a transmission system for electric currents of high frequency in which energy flows between balanced and unbalanced circuits, the combination comprising, a first circuit means for converting a voltage which is unbalanced with respect to ground to a voltage which is balanced with respect to ground comprising a main winding connected to an unbalanced circuit at one end, said main winding comprising several turns of a coaxial line having an inner conductor and an outer conductor, a ground connection to the outer conductor of the main winding at the connection to the unbalanced circuit, an auxiliary winding having the same number of conductor turns as said main winding, said auxiliary winding being connected between said outer conductor of said main winding at the connection to the unbalanced circuit and the inner conductor of said main winding at the other end of said main winding, and a first magnetic core on which said main winding and said auxiliary winding are inductively disposed, said first magnetic core being formed from ferrite magnetic material to reduce the losses in said magnetic core at higher frequencies; a second circuit means for matching the impedances of said balanced and unbalanced circuits connected in series circuit relationship with the said first circuit circuit means and comprising several additional windings, at least two of said windings having an equal number of turns, said additional windings comprising balanced circuit line sections, and a magnetic core structure on which only two of said additional windings are inductively disposed, said magnetic core being formed from ferrite magnetic material, said additional windings being connected in parallel circuit relationship with respect to the connection to said main winding at one end of the additional windings and in series circuit relationship with respect to a balanced circuit at the other end of said additional windings, said main winding of said first circuit means being connected to said second circuit means at one end thereof and to an unbalanced circuit at the other end thereof.

3. In a transmission system for electric currents of high frequency in which energy flows between circuits having different impedances, the combination comprising, a first winding comprising several turns of balanced transmission line, a second winding of balanced transmission line having the same number of turns as said first winding, a third uncoiled winding of balanced transmission line having the same length as said first and second windings, a magnetic core structure on which only said first and second windings are inductively disposed, said magnetic core being formed from ferrite magnetic material to reduce the losses in said magnetic core at higher frequencies, said first, second and third windings being connected in parallel circuit relationship with respect to a first circuit at one end of said first, second and third windings and in series circuit relationship with respect to a second circuit at the other end of said first, second and third windings.

4. In a transmission system for electric currents of high frequency in which energy flows between circuits having different impedances, the combination comprising, a first winding comprising several turns of balanced transmission line, a second winding of balanced transmission line having the same number of turns as said first winding, a third uncoiled winding of balanced transmission line having the same length as said first and second windings, a magnetic core structure on which only said first and second windings are inductively disposed, said magnetic core being formed from ferrite magnetic material to reduce the losses in said magnetic core at higher frequencies, said first, second and third windings being connected in parallel circuit relationship with respect to a first circuit at one end of said first, second and third windings and in series circuit relationship with respect to a second circuit at the other end of said first, second and third windings, the characteristic impedance of each of said balanced transmission lines being substantially equal and substantially three times the characteristic impedance of one of said circuits and substantially one-third the characteristic impedance of the other of said circuits.

5. In a transmission system for electric currents of high frequency from approximately two to thirty megacycles in which energy flows between balanced and unbalanced circuits, the combination comprising, a first circuit means for converting a voltage which is unbalanced with respect to ground to a voltage which is balanced with respect to ground comprising a main winding connected to an unbalanced circuit at one end, said main winding comprising several turns of a coaxial line having an inner conductor and an outer conductor, a ground connection to the outer conductor of the main winding at the connection to the unbalanced circuit, an auxiliary winding having the same number of turns as said main winding and of a conductor the same size and shape as the outer conductor of said main winding, said auxiliary winding being connected between said outer conductor of said main winding at the connection to the unbalanced circuit and the inner conductor of said main winding at the other end of said main winding, and a first magnetic core on which said main winding and said auxiliary winding are inductively disposed, a second circuit means for matching the impedances of said balanced and unbalanced circuits connected in series circuit relationship with the said first circuit means and comprising several additional windings, at least two of said windings having an equal number of turns, said additional windings comprising balanced circuit line sections, and a second magnetic core structure on which only two of said additional windings are inductively disposed, said additional windings being connected in parallel circuit relationship with respect to the connection to said main winding at one end of the additional windings and in series circuit relationship with respect to a balanced circuit at the other end of said additional windings, said main winding of said first circuit means being connected to said second circuit means at one end thereof and to an unbalanced circuit at the other end thereof, said first and second magnetic cores each being formed from ferrite magnetic material to reduce losses in said cores at higher frequencies.

References Cited by the Examiner

UNITED STATES PATENTS

| | | | |
|---|---|---|---|
| 2,777,996 | 1/57 | Bruene | 333—26 |
| 3,051,918 | 8/62 | Germeshausen | 333—78 |

HERMAN KARL SAALBACH, *Primary Examiner.*